United States Patent [19]

Shappell

[11] Patent Number: 5,174,591
[45] Date of Patent: Dec. 29, 1992

[54] EXTENDABLE NESTING SKI SUPPORT

[75] Inventor: Mark C. Shappell, Lansing, Mich.

[73] Assignee: Shappell Corporation, Lansing, Mich.

[21] Appl. No.: 741,116

[22] Filed: Aug. 5, 1991

[51] Int. Cl.⁵ ............................................. B62B 9/04
[52] U.S. Cl. ..................................... 280/20; 280/22; 280/25
[58] Field of Search ............. 280/20, 25, 845, 17, 280/19.1, 23.1, 28.12, 28.15, 28.16, 22

[56] References Cited

U.S. PATENT DOCUMENTS

| | | | |
|---|---|---|---|
| 172,109 | 1/1876 | Francis | 280/20 |
| 930,729 | 8/1909 | Chambers | 280/20 |
| 1,364,423 | 1/1921 | Brown | 280/20 |
| 1,903,930 | 4/1933 | Miller | 280/28.15 |
| 2,301,089 | 11/1942 | Stevens | 135/3 |
| 3,352,313 | 11/1967 | Kroening | 135/1 |
| 3,580,592 | 5/1971 | Schecengost | 280/20 |
| 3,635,488 | 1/1972 | Bauer | 280/25 |
| 3,643,979 | 2/1972 | Richards | 280/28 |
| 3,658,357 | 4/1972 | Porsche et al. | 280/25 |

Primary Examiner—Eric D. Culbreth
Attorney, Agent, or Firm—Miller, Morriss & Pappas

[57] ABSTRACT

An extendable nesting ski support structure as for supporting cargo including collapsed shelter devices for towing or pulling over ice, snow, and terrain. The skis are pivoted on brackets attached to the supported base and the brackets are atttached to the upper surface of flexible and resilient skis. By longitudinal shifting of the skis they are extendable and retractable as between sill supports beneath the supported base. The resilience and the flexibility improves the support system by providing shock absorption while in the extended position. A single lock serves both the extended and retracted skis, and on extension and locking, the skis are shaped by the flexural characteristics of the material of the ski.

4 Claims, 2 Drawing Sheets

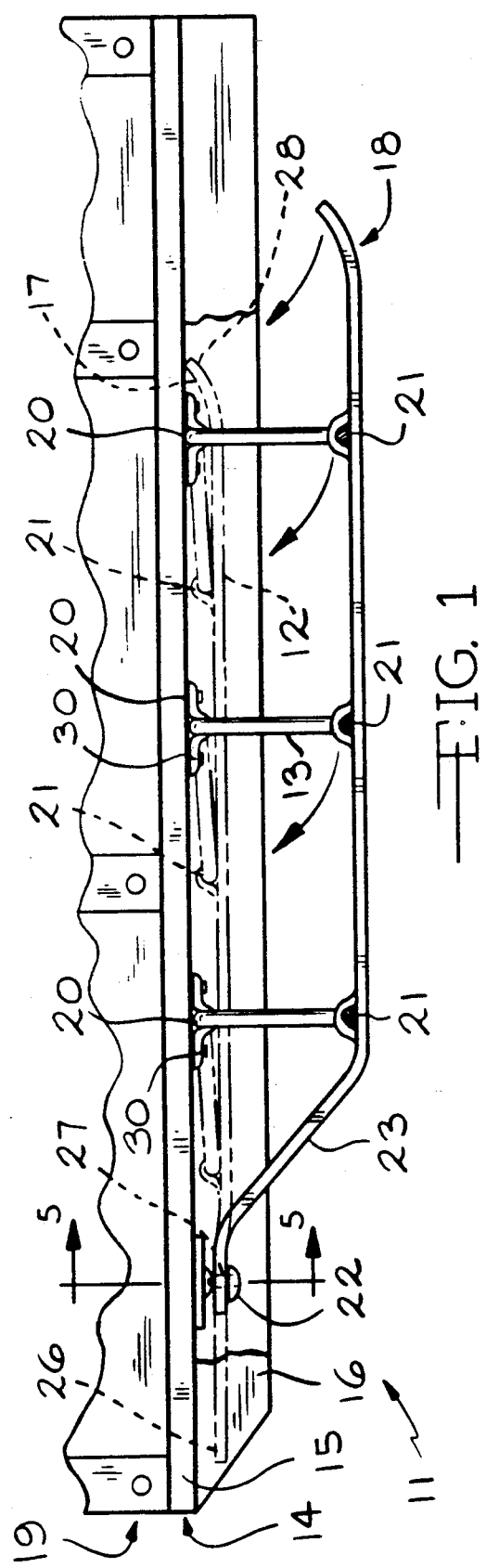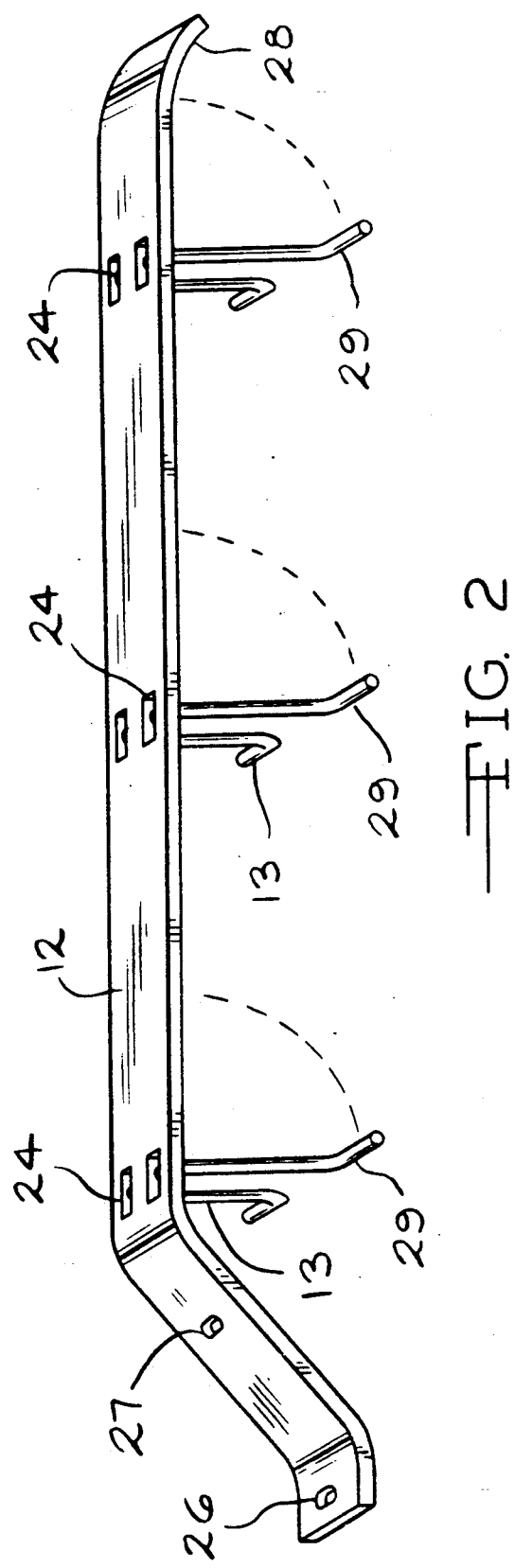

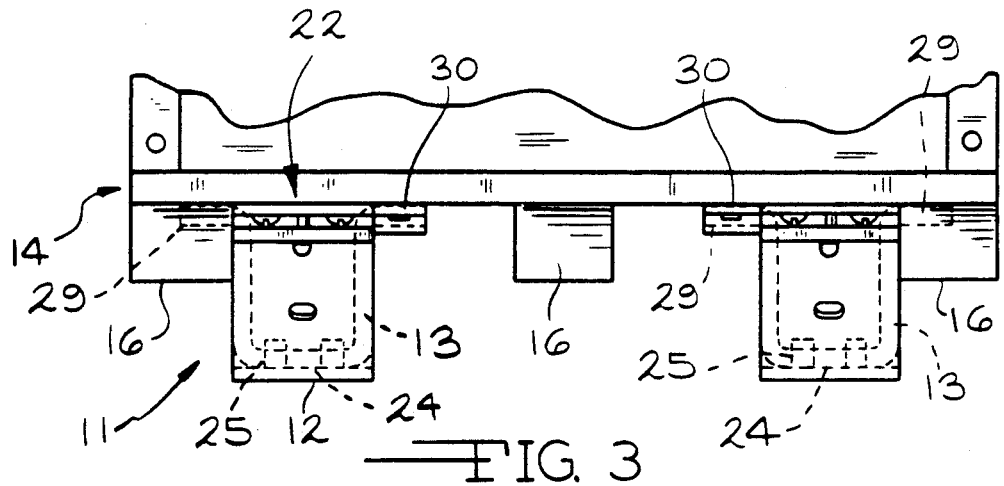
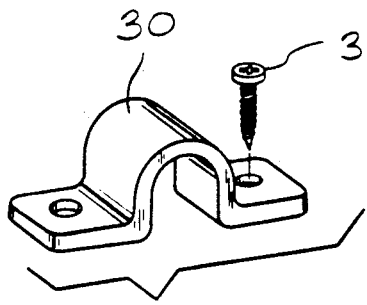
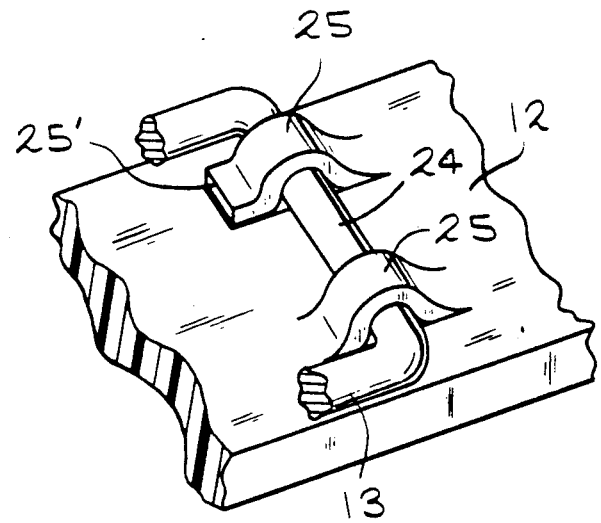
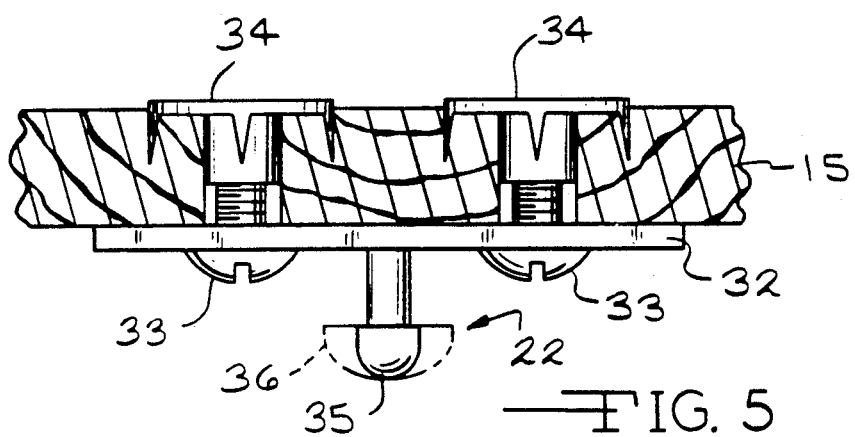

EXTENDABLE NESTING SKI SUPPORT

FIELD OF THE INVENTION

The present invention relates to an extendable nesting ski support structure in which a relatively flat resilient ski element is placed in tension thereby extending the ski and supporting it. On pivoted brackets the thus supported skis are movable from a nested collapsed condition to an extended support position. The invention is of extreme utility in cargo hauling situations and where the cargo must be hauled over slippery and rough terrain as for example over ice, slush, snow and mixes thereof and including muddy and earth patches of ground. Thus, the structure of the present invention provides a convertible support beneath a bed or base and the structure can be lowered to ground surface or lifted up off of the ground surface by retracting or extending the runners.

BACKGROUND

Most sleds or skid-like devices are equipped with runners of a very small width as they meet the earth or ice and snow approximating skate blades in their knife edge. The runners generally are of substantial length and they are in rigid support of a cargo or base or superstructure so that in use the cargo or material supported by the runners is subjected to severe shock loading as the runners are moved over rough and irregular terrain. Insofar as the applicant is aware none of the known structures having runners are alternately nestable against the surface to be supported and are extendable therefrom; none of the runner structures provide a shock absorption function in which the runners or skis flex under impact loading as they are subjected to deformation so that the load on the runners is cushioned; none of the prior sled-like devices, as known to applicant, have skis (of substantial width) which upon tensioning from one end are extended from the cargo base; and none provide smooth and flexible skis between hinged support brackets.

The structures as claimed herein first found use in the ski supports for recreational structures such as erected and collapsed ice fishing shanties. Such shanties are dragged or pushed across terrain, ice and snow and are collapsed or disassembled repeatedly in moving from one selected site to another site.

DESCRIPTION OF RELATED ART

The closest known art is that of U.S. Pat. No. 1,721,109 by Samuel W. Francis in which rigid channel-like runners are pivotally supported by struts depending from an upper and registering channel-like support element and the runner elements may upon removal of a hinge pin, be shifted rearwardly in a track of the upper support member. Then the spaced apart adjacent runners hingedly shift their relative position, longwise, so that the diagonal bracing collapses one runner against the other in side to side overlapping relation. In such a structure, while foldable, the resilience and flexibility of the runners is not present. The folding of the Francis device requires a hinge pin disconnect so that the toe portion of the runner may be slid rearwardly so that the upper support bar and runner close on each other and over the hinged struts. The prior art device is at structural variance from the present invention and is functionally different in that the device of the present invention affords a cushion ride upon ski extension and a substantially flat nesting registry upon collapse, both lacking in the Francis structure as understood.

U.S. Pat. No. 930,729 to Worthy L. C. Chambers is a steel rod structure wholly unlike the ski surface of the present structure and the collapse of the Chambers device is a folding collapse which does not achieve registry of the ski elements within the hinged brackets as in the presently described structure.

U.S. Pat. No. 2,301,089 to Rollo Stevens is directed to a portable enclosure such as a collapsible fishing shanty and arranged on detachable runners.

U.S. Pat. No. 3,352,313 to Martin J. Kroening is a structure for a fold-a-door fish house which uses firmly fixed and fully extended ski runners attached to the front side of the house as erected and forming skids for towing.

None of the indicated structures are seen to singly or collectively suggest the presently claimed invention. Accordingly the presently claimed invention is expressive of substantial novelty, utility and is non-obvious from the known art.

SUMMARY OF THE INVENTION

The invention is directed to a nesting ski support structure which includes at least one elongate flexible and resilient ski of heavy gauge sheet material. Each such ski is hingedly supported by a plurality of hinge brackets positioned at spaced intervals along the length of each ski and straddling the ski at the connection to the supported base while coupled to the upper side of the ski as it is extended. The brackets are connected hingedly to a relatively rigid base or support and in offset relation to the ski attachment. The base may support a superstructure and a variety of knock-down shelters. When hinged to the base and also to the ski the hinge brackets work together, flattening the ski to the base or selectively extending the ski from the base as the ski is moved in a longitudinal manner. A lock means at one end of the base supported structure is provided and which secures the ski in an extended position when the ski is moved outwardly on the brackets. A separate lock position is provided for securing the skis in a nesting or retracted position. Variants in form and structure will be noted as the description proceeds. The character of the ski material allows the retention of the spacing interval with flexure and selected deformation under load.

BRIEF DESCRIPTION OF THE DRAWING

In the drawing:

FIG. 1 is a side elevation view of the ski structure of the present invention shown in support of a cargo carrying superstructure and in support of the base thereof and illustrating the extended condition of the ski elements and the alternate nested position in phantom-line and featuring the hinge relationship as between the fixed and movable ends of the pivot brackets.

FIG. 2 is a perspective view of the ski and the support brackets and inverted from the position in FIG. 1 to indicate the forming of the integral ski-journal elements in the flexible and resilient ski and showing the two lock slots in spaced relation, the endmost forward slot serving the extended position of the ski and the rearmost or inboard slot serving the nested position at the lock.

FIG. 3 is an end elevation view of the structure of FIG. 1 and indicating the outboard journalling of the brackets at the supported base element, one form of support is in the adjacent sills and the other is in the form of a strap-type support element.

FIG. 4 is a perspective view of the strap-type support shown on the inboard of the base bracket hinges or pivots where there are no inboard sills.

FIG. 5 is a side elevation cross section taken on the line 5—5 of FIG. 1 and indicating a turn fastener or lock selectively positionable in the lock slots of the ski.

FIG. 6 is somewhat of a side elevation partial section through the bracket elements and indicating the integral formed hinge in the resilient and flexible relatively thick ski.

DESCRIPTION OF THE PREFERRED EMBODIMENT

Referring to the Drawing and at first with respect to FIG. 1, the extendable nesting ski support structure 11 is shown in extended position (full line) and in nested position (phantom line), the ski element 12 shifting on the hinge brackets 13 from the base element or base structure 14 consisting of base plate 15 and ground support sills 16 in the nested position 17 to the extended position 18 as shown. The profile of FIG. 1 clearly indicates the deformation of the forward portion of the ski 12 in the extended position 18.

The cargo or superstructure 19 as carried on the base structure 14 may comprise a box or a complex of stored and fixed elements to form, for example, a shelter such as an ice fishing shanty. The force arrows indicate the concurrent movement of the brackets 13 on the upper fixed pivots or hinges 20, and on the movable ski connected hinges 21, the latter collapsing nestably in position 17 between the sills 16 as shown in phantom line. A lock 22, preferably of the turn-to-lock type is selectively positioned through one or two openings, as will be seen as the ski element 12 is shifted longitudinally in elevation or nesting of the ski element 12. As is clear in the FIG. 1, as the flexible and resilient ski-element 12 is moved rearwardly, as shown, the curvilinear deformation 23 of the normally flat lying ski 12 forms a ramp-like upturned face or toe at the front of the ski element 12. At extension of ski 12 the positioning of the movable hinges or pivots 21 are secured, at locking of the ski 12, as shown in a very good and rigidly resilient manner in prevention of accidental collapse. Thus retained by the hinges 21 the ski element 12 provides a shock absorbing function while, as extended, the ski 12 is secured in place. The same rigid resilient and flexural properties of the ski 12 allows its nesting as shown in phantom line with the pivots or hinges 20 and 21 in substantially planar registry with the base element 15 as between the sills 16.

In FIG. 2 the ski 12 is upended from the showing in FIG. 1 and the U-shaped general from of the brackets 13 are better appreciated. The brackets are preferably made of metal and especially heavy metal (steel) wire (¼ inch DIA in the unit illustrated). The journalling of the cross bar portion 24 of the U-shaped brackets 13 are preferably journalled by integrally formed straps 25 as by lancing and heat softening with local forming, as shown, so that the formed and shaped brackets 13 do not project into the broad support plane surface or bottom of the skis 12. In the FIG. 2 the lock slots 26 and 27 through the thick stock of the ski 12 are both visible. The slightly upturned rear edge or heel 28 of the ski 12 is also seen in FIG. 2 and is also visible in FIG. 1. The out-turned pintel extensions 29 of the brackets 13 are in journal support in either the journals 20 as provided by openings in the sills 16 or by journal elements 30 of the strap type best seen in FIGS. 1 and 4. The strap type journal elements 30 are screwed as by screws 31 to the base structure 14.

FIG. 5 best illustrates the turn-to-lock structure 22 and plate portion 32 is fastened to the base element 14 by threaded fasteners 33 assisted by the T-nuts 34 driven into or otherwise secured to the base element 14. Locking occurs by inserting the turnable head 35 into selected of the slots 26 and 27 (FIG. 2). In phantom line the detenting-quarter turn of head 35 assumes the position 36 extending across and over the smaller of the dimensions of the slots 26 and 27.

The FIG. 6 is a detail fragment of the bracket element 13 and indicating the integral hinge straps 25 and 25' formed in the preferred high density polyethylene material forming the elongate wide skis 12 as otherwise indicated rising above the upper surface of the ski 12. This is achieved by longitudinally aligned lancing of the 0.150 inch heavy gauge sheet through the thickness of the thermoplastic material. By the application of heat and force journal straps 25 and 25' are formed. The skis 12 may be otherwise formed in metal and a wide variety of alternate plastic materials but the preferred high density polyethylene in a variety of gauges is readily available in virgin and reclaimed form and the hinges 21 assure an excellent pivotal fabrication element which is economical to produce. Under severe stress the material of the skis 12 perform well and retain good flexible qualities. The material is tough, rugged and weather resistant. Thus formed, the preferred wire rod stock of the brackets 13 are threaded through the paired journal rings on straps 25 and 25'. The result is a tough durable and abrasive resistant ski material which is sufficiently resilient as to deform to provide the toe curvature 23 of FIG. 1 and to restore the ski 12 to flatness on nesting the ski 12 against the base 14 and securing it at the lock 22 at the nesting slot 27.

When the skis 12 are not needed and the nest or retracted position 17 is established, then the sills 16 bottom on the ice, or ground or snow until such time as the skis 12 are again needed for transport. In usage the resilience of the material of the skis 12 flexes sufficiently to modulate the shock of uneven terrain and all the while with a substantial width of ski to ground surface.

Having thus described my invention and the preferred embodiment thereof, others skilled in the art will readily perceive its innovativeness and durability in service, others will appreciate improvements, changes and modifications within the skill of the art and such improvements, changes and modifications are intended to be included herein limited only by the scope of the hereinafter appended claims.

I claim:

1. An extendable nesting and shock absorbing ski and support structure comprising:
   a base element support structure having a support platform and ground contact sill portions;
   a lock means secured to said base element support structure;
   hinge brackets secured in hinged selected nested and depending relation to said base element;
   at least one flexible elongate and resilient ski having a thickness of about 0.15 inches and having a toe end, said at least one ski secured to said hinge brackets in pivotal relation in substantially the same space intervals as said hinge brackets at said base element thereby selectively providing an inoperative position of said skis against said base element and providing an operative extended position of said skis having a curvilinear profile, said skis having two slot openings therethrough and selectively engageable by said lock means to secure said skis selectively in said operative extended position and in said inoperative nested, at least one of said skis selectively movable by longitudinal shifting position.

2. In the structure of claim 1 wherein said skis each include a pair of longitudinally spaced apart lock slots at said toe end of each of said skis, one of said lock slots selectively engaged with said lock means in the extended operative position of each of said skis and the other of said lock slots selectively engaged with said lock means in the inoperative nested condition of each of said skis.

3. An extendable nesting ski support comprising:
at least one elongate flexible and resilient ski of heavy gauge sheet plastic material;
a plurality of hinge brackets in hinged support engagement with at least one ski in intervals along the length of said at least one ski;
a base support structure hingedly connected to said brackets above and parallel to said at least one ski, whereby said at least one ski, upon longitudinal movement in respect to said base support structure, is selectively extended from said base support structure and is selectively retracted to nest against said base support structure;
lock means at one end of said base support structure and operably engageable with one end of said at least one ski when said at least one ski is extended and said brackets are erected, thereby deforming said at least one ski at one of the ends of said at least one ski into locking position with said lock means in said base support structure.

4. In the extendable nesting ski support of claim 3 wherein each of said hinge brackets include integral journal portions at each end, one of said journal portions having a bail-like portion and the other of said journal portions forming laterally extending rod-like axles in coaxial spaced apart relation to each other, said bail-like portions and said axle-journal portions being respectively in operable hinged relation, one with said base support structure and the other in spaced apart hinged relation to said at least one ski.

* * * * *